United States Patent
Pierowicz et al.

(10) Patent No.: US 6,516,273 B1
(45) Date of Patent: Feb. 4, 2003

(54) METHOD AND APPARATUS FOR DETERMINATION AND WARNING OF POTENTIAL VIOLATION OF INTERSECTION TRAFFIC CONTROL DEVICES

(75) Inventors: John A. Pierowicz, Lancaster, NY (US); Herbert A. Pirson, Amherst, NY (US); David Yuhnke, Wlliamsville, NY (US)

(73) Assignee: Veridian Engineering, Inc., Arlington, VA (US)

( * ) Notice: Subject to any disclaimer, the term of this patent is extended or adjusted under 35 U.S.C. 154(b) by 0 days.

(21) Appl. No.: 09/433,717

(22) Filed: Nov. 4, 1999

(51) Int. Cl.[7] .............................. G06G 7/70; G08G 1/00

(52) U.S. Cl. ..................... 701/301; 701/117; 340/903; 340/929

(58) Field of Search ............................ 701/301, 117, 701/207, 118, 208, 209, 210, 213, 119; 340/903, 904, 905, 906, 901, 902, 907, 436, 438, 929, 932, 994; 455/456, 32.1, 67.5; 342/357.13, 357.06, 357.08

(56) References Cited

U.S. PATENT DOCUMENTS

| | | | | |
|---|---|---|---|---|
| 4,223,295 A | * | 9/1980 | Bonner et al. | 340/906 |
| 4,308,536 A | | 12/1981 | Sims, Jr. et al. | 343/7 |
| 5,014,052 A | * | 5/1991 | Obeck | 340/906 |
| 5,177,685 A | * | 1/1993 | Davis et al. | 455/456 |
| 5,243,528 A | | 9/1993 | Lefebvre | 364/449 |
| 5,270,936 A | | 12/1993 | Fukushima et al. | 364/444 |
| 5,334,986 A | | 8/1994 | Fernhout | 342/357 |
| 5,371,497 A | | 12/1994 | Nimura et al. | 340/995 |
| 5,398,189 A | | 3/1995 | Inoue et al. | 364/449 |
| 5,470,233 A | | 11/1995 | Fruchterman et al. | 434/112 |
| 5,485,161 A | | 1/1996 | Vaughn | 342/357 |
| 5,504,482 A | | 4/1996 | Schreder | 340/995 |
| 5,529,138 A | | 6/1996 | Shaw et al. | 180/169 |
| 5,539,398 A | * | 7/1996 | Hall et al. | 340/907 |
| 5,610,815 A | | 3/1997 | Gudat et al. | 364/424.027 |
| 5,638,279 A | | 6/1997 | Kishi et al. | 364/443 |
| 5,646,853 A | * | 7/1997 | Takahashi et al. | 455/456 |
| 5,652,705 A | * | 7/1997 | Spiess | 701/117 |

(List continued on next page.)

FOREIGN PATENT DOCUMENTS

| | | | |
|---|---|---|---|
| DE | 197 56 698 | * | 7/1999 |
| EP | 0543543 | * | 5/1993 |

OTHER PUBLICATIONS

International Search Report of PCT/US00/41760.*

*Primary Examiner*—Jacques H. Louis-Jacques
(74) *Attorney, Agent, or Firm*—Steptoe & Johnson LLP

(57) ABSTRACT

The present invention relates to a system installed in a vehicle to: determine the location of the vehicle; identify each intersection as the vehicle approaches the intersection; determine the presence and type of traffic control device at that intersection; determine whether the traffic control device associated with the intersection, in the direction of travel of the vehicle, requires the vehicle to come to a complete stop; determine the acceleration required to stop the vehicle prior to its entry into the intersection; and, if the required acceleration exceeds a predetermined threshold level, alert the driver, by means of an aural, visual and/or haptic indication, to brake the vehicle prior to its entry into the intersection. The system may also preempt driver control of the braking system and begin braking the vehicle automatically prior to its entry into the intersection. In another embodiment of the invention, the system may determine the phase of the traffic light via a communications channel between the vehicle and the traffic light; repetitively check to see if the vehicle is entering the intersection in contravention of the traffic light's indication and, if the vehicle does so begin to enter the intersection, then alert the driver, by means of an alarm or indication, to brake the vehicle prior to its entry into the intersection.

44 Claims, 6 Drawing Sheets

U.S. PATENT DOCUMENTS

| | | | | |
|---|---|---|---|---|
| 5,742,240 A | * | 4/1998 | Asanuma et al. | 340/995 |
| 5,757,289 A | | 5/1998 | Nimura et al. | 340/995 |
| 5,774,071 A | | 6/1998 | Konishi et al. | 340/988 |
| 5,778,333 A | | 7/1998 | Koizumi et al. | 701/212 |
| 5,793,631 A | | 8/1998 | Ito et al. | 364/449.5 |
| 5,808,565 A | * | 9/1998 | Matta et al. | 340/994 |
| 5,835,881 A | | 11/1998 | Trovato et al. | 701/211 |
| 5,847,661 A | * | 12/1998 | Ricci | 340/902 |
| 5,850,193 A | | 12/1998 | Shimoura et al. | 340/995 |
| 5,874,905 A | | 2/1999 | Nanba et al. | 340/995 |
| 5,926,113 A | * | 7/1999 | Jones et al. | 340/906 |
| 5,939,976 A | * | 8/1999 | Sasaki et al. | 340/435 |
| 5,940,010 A | * | 8/1999 | Sasaki et al. | 340/901 |
| 5,955,968 A | * | 9/1999 | Bentrott et al. | 430/906 |
| 6,008,741 A | * | 12/1999 | Shinagawa et al. | 701/117 |
| 6,018,697 A | * | 1/2000 | Morimoto et al. | 701/209 |
| 6,047,234 A | * | 4/2000 | Cherveny et al. | 701/200 |
| 6,067,031 A | * | 5/2000 | Janky et al. | 340/903 |
| 6,084,543 A | * | 7/2000 | Iizuka | 342/357.13 |
| 6,088,652 A | * | 7/2000 | Abe | 701/208 |
| 6,125,323 A | * | 9/2000 | Nimura et al. | 701/207 |
| 6,253,150 B1 | * | 10/2000 | Nakamura | 701/208 |
| 6,268,804 B1 | * | 7/2001 | Janky et al. | 340/903 |

* cited by examiner

METHOD AND APPARATUS FOR DETERMINATION AND WARNING OF POTENTIAL VIOLATION OF INTERSECTION TRAFFIC CONTROL DEVICES

FIELD OF THE INVENTION

The present invention relates to a vehicle collision avoidance apparatus, and more particularly, to a vehicular method and apparatus for determining and warning of potential violations of intersection traffic control devices.

BACKGROUND OF THE INVENTION

A collision sequence begins when the subject vehicle ("SV"), through its own action or inaction, begins a chain of events which ultimately results in a collision with at least one principle other vehicle ("POV"). Intersection collisions can be classified into at least four separate scenarios as shown in Table 1.

TABLE 1

Intersection Collision Scenarios

| Scenario | Characteristics | Percent |
|---|---|---|
| 1 | Parallel Path - Left Turn Across Path | 23.8 |
| 2 | Perpendicular Path - Inadequate Gap | 30.2 |
| 3 | Premature Intersection Entry | 2.1 |
| 4 | Perpendicular Path - Violation of Traffic Control Device | 43.9 |
| | Total | 100.0 |

Systems have been proposed that could assist in preventing accidents of Scenarios 1 and 2 through use of an active system of collision avoidance. This type of active system is exemplified by the anti-collision radar system of U.S. Pat. No. 4,308,536 to Simms, Jr. et al., which utilizes a pulsed radar and determines whether braking or maneuvering is required to avoid a detected object. Another active system is described in U.S. Pat. No. 5,529,138 to Shaw et al., which utilizes two sets of lasers to determine the imminence of vehicular collisions. However, such systems have not gained public acceptance or popularity.

Scenario 4 involves violation of a traffic control device by a vehicle entering an intersection in contravention of the traffic control device's indication. There are at least two types of commonly known traffic control devices used at intersections in the United States: the automatically phased traffic light and the stop sign. An automatically-phased traffic light typically cycles through three phases: red, green, and yellow. It is commonly-known that red indicates that a driver is to stop his vehicle prior to entering the intersection, green indicates that the driver is permitted to proceed through the intersection, and yellow indicates that the driver is warned that a related green signal is being terminated and a red signal is about to appear and that the driver should prepare to stop his vehicle prior to entering the intersection unless the driver is so close that a stop cannot safely be made. The stop sign indicates that a driver is to stop his vehicle prior to entering the intersection.

SUMMARY OF THE INVENTION

An object of the present invention is to reduce accidents.

A further object of the invention is to provide a method and apparatus installed in a vehicle (hereinafter referred to as an "in-vehicle system") to: (1) determine the location of the vehicle; (2) identify each intersection as the vehicle approaches the intersection; (3) determine the presence and type of traffic control device at that intersection; (4) determine whether the traffic control device associated with the intersection, in the direction of travel of the vehicle, requires the vehicle to come to a complete stop; (5) determine the acceleration required to stop the vehicle prior to its entry into the intersection; and (6) if the required acceleration exceeds a predetermined threshold level, alert the driver to brake the vehicle prior to its entry into the intersection by means of an aural, visual and/or haptic indication.

Another object of the invention is to provide a method and apparatus installed in a vehicle to: (1) determine the location of the vehicle; (2) identify each intersection as the vehicle approaches the intersection; (3) determine the presence and type of traffic control device at that intersection; (4) determine whether the traffic control device associated with the intersection, in the direction of travel of the vehicle, requires a complete stop; (5) determine the acceleration required to stop the vehicle prior to its entry into the intersection; and (6) if the required acceleration exceeds a predetermined threshold level, preempt driver control of the braking system and begin braking the vehicle automatically prior to its entry into the intersection.

Another object of the invention is to provide a method and apparatus installed in a vehicle to: (1) determine the location of the vehicle; (2) identify whether the vehicle is stopped at a phased traffic light; (3) determine the phase of the traffic light via a communications channel between the vehicle and the traffic light; (4) repetitively check to see if the vehicle is entering the intersection in contravention of the traffic light's indication and, (5) if the vehicle does so begin to enter the intersection, then alert the driver, by means of an alarm or indication, to brake the vehicle prior to its entry into the intersection.

These and other objects are achieved by providing an in-vehicle system for determining and warning of potential violation of intersection traffic control devices. The in-vehicle system features a data storage device, a processing device, a Global Positioning System ("GPS") receiver, a geographical information system ("GIS") digital database, an interface for entering and/or editing data into the data storage device, and an interface for alerting the driver of any impending violation of a traffic control device. The in-vehicle system may also include a visual or aural display for providing the driver with in-vehicle system-related information, a capability for communicating with an oncoming traffic control device to determine its status, and a capability for braking the vehicle without driver assistance, such as an auxiliary braking system or an interface which allows the in-vehicle system to gain control of the vehicle's primary braking system.

The in-vehicle system features a GPS receiver which generates the latitude and longitude, heading, and velocity of the equipped-vehicle. The in-vehicle system utilizes a GIS database and correlates the vehicle's latitude, longitude and heading, as generated by the GPS receiver, with approaching latitude and longitude of intersections. The GIS database includes a geographic location digital database that contains the positional data (e.g., latitude and longitude) and informational data (e.g., number of lanes) of all roadways within the geographic region covered by the database. The GIS database may also include intersection data (e.g., the types and locations of traffic control devices at each intersection) or such data may be present in an auxiliary datafile. The processing device deduces the distance to the intersection and closing rate information by processing vehicle location as determined by GPS or Differential GPS ("DGPS"), and GIS database information. This data is then further operated upon to yield a metric indicative of the amount of acceleration required to prevent vehicle entry into the intersection. The amount of acceleration required to prevent vehicle entry into the intersection is hereinafter referred to as "$a_p$."

As an equipped-vehicle approaches an intersection that has been determined to have a traffic control device that requires the driver to stop (e.g., a stop sign or red traffic light), the in-vehicle system repetitively calculates a value of $a_p$. The calculated $a_p$ is compared to a threshold level to determine the potential for driver violation of the intersection's traffic control device.

In an alternate embodiment, once $a_p$ exceeds a threshold level, driver braking control is preempted and the in-vehicle system automatically begins applying braking power to the vehicle. In either embodiment, the overall objectives of the invention are satisfied by warning the driver of the equipped-vehicle of a potential violation of a traffic control device and thus avoiding a potential collision of the type identified in Scenario 4 of Table 1.

In yet another alternate embodiment, the equipped-vehicle's position and lack of forward velocity are compared to the phase of a phased traffic device (ie., a traffic light). If forward motion is detected while the traffic control device is indicating red, then a warning will be issued to the driver, thus avoiding a potential collision of the type identified in Scenario 3 of Table 1.

Other objectives and features of the invention will appear in the course of the description that follows.

BRIEF DESCRIPTION OF THE FIGURES

The invention will be described below with reference to the following figures.

DETAILED DESCRIPTION OF THE INVENTION

A preferred embodiment of the present invention is hereinafter described with reference to the accompanying drawings.

Figure 1:
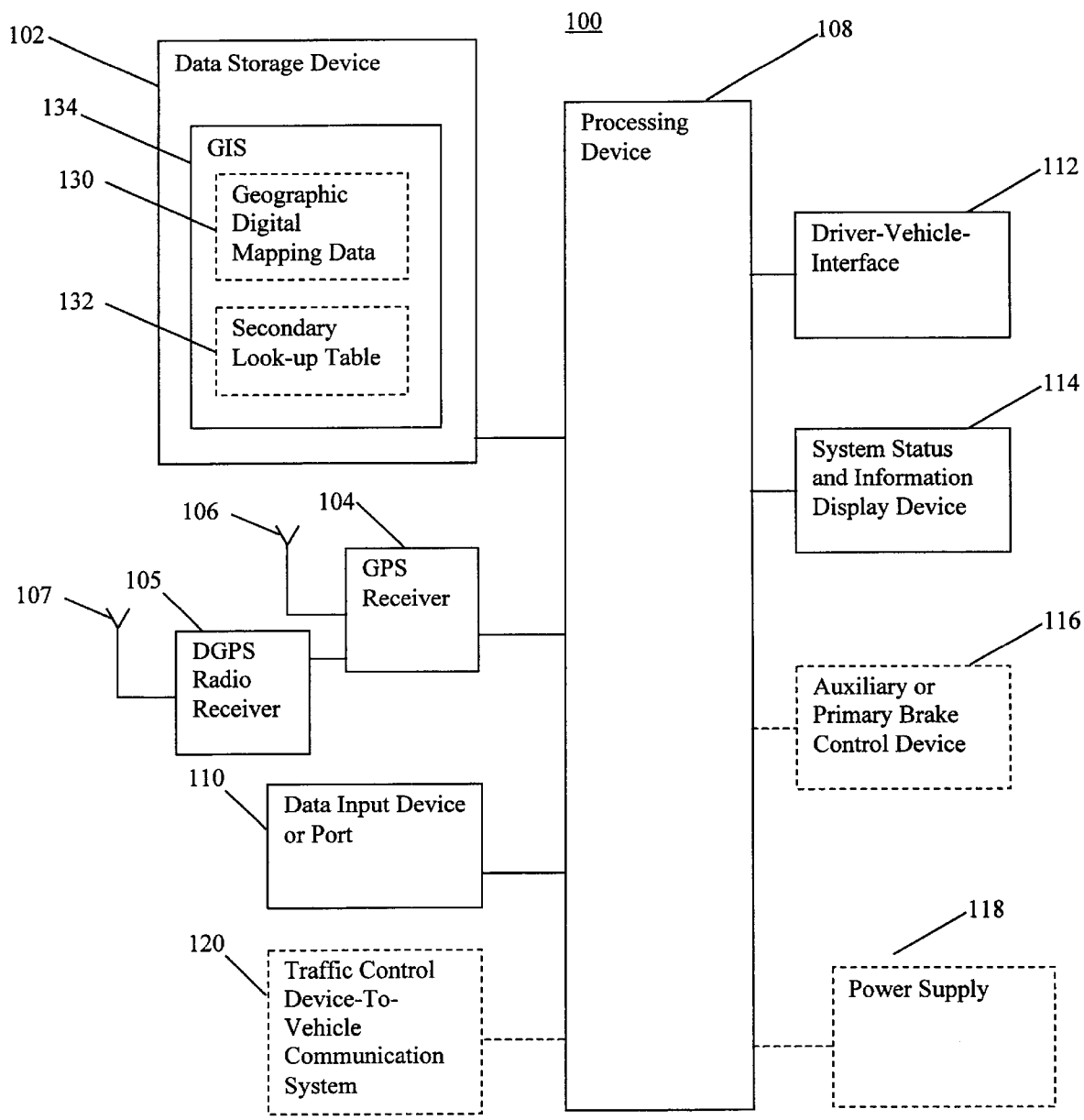
FIG. 1 is a block diagram of hardware and software components of an exemplary in-vehicle system embodying the present invention.

FIG. 1 illustrates a suitable in-vehicle system 100 to at least warn of possible violations of traffic control devices at intersections. In a preferred embodiment the in-vehicle system 100 includes a data storage device 102, a GPS receiver 104 and an associated antenna 106, a differential GPS radio receiver 105 and an associated antenna 107, a processing device 108, a data input device or port 110, a driver-vehicle-interface 112, and an in-vehicle system status and information display device 114. A power supply 118 may be integrated into the in-vehicle system 100 or the in-vehicle system 100 may draw power directly from the equipped-vehicle.

Additionally, an auxiliary or primary braking control interface may be integrated into the in-vehicle system 100 such that the in-vehicle system 100 may initiate braking, or utilize braking as a haptic warning to the driver. Furthermore, a traffic-control-device-to-vehicle communication system 120 may be integrated into the in-vehicle system 100 to provide a communications link between a phased traffic light and an equipped-vehicle through which an equipped-vehicle may obtain the phase and time to phase change of a traffic light. Each of the elements recited above will be described in greater detail below.

The data storage device 102 may be any mass storage device, for example, a hard disk, a CD-ROM, a readable/writable CD, a digital tape, or a solid state memory. The data storage device 102 may be integrated with the processing device 108 (as in the case of a laptop computer with a built-in hard disc and/or CD-ROM) or may be a stand-alone device. For example, the data storage device may be a 200 MB hard disc drive in a computer using an Intel (TM) '486 processor, where the PC otherwise serves as the processing device 108 for the in-vehicle system 100. More than one type of data storage device, or a plurality of a single type of data storage devices, or any combination thereof may be used. Additionally, data storage may be accomplished, for example, via the use of a juke-box type CD-ROM storage device, whereby a plurality of CD-ROMs are stored in the device while one of the plurality is selected for reading.

The data storage device 102 stores, at least, a GIS 134. The data storage device 102 may or may not be dedicated to the in-vehicle system 100 and therefore may store other information. The GIS 134 comprises, among other information, geographic digital mapping data 130. Such geographic digital mapping data 130 will hereinafter be referred to as a map datafile 130. The map datafile 130 contains a digitized description of roadway geometries.

Figure 2:
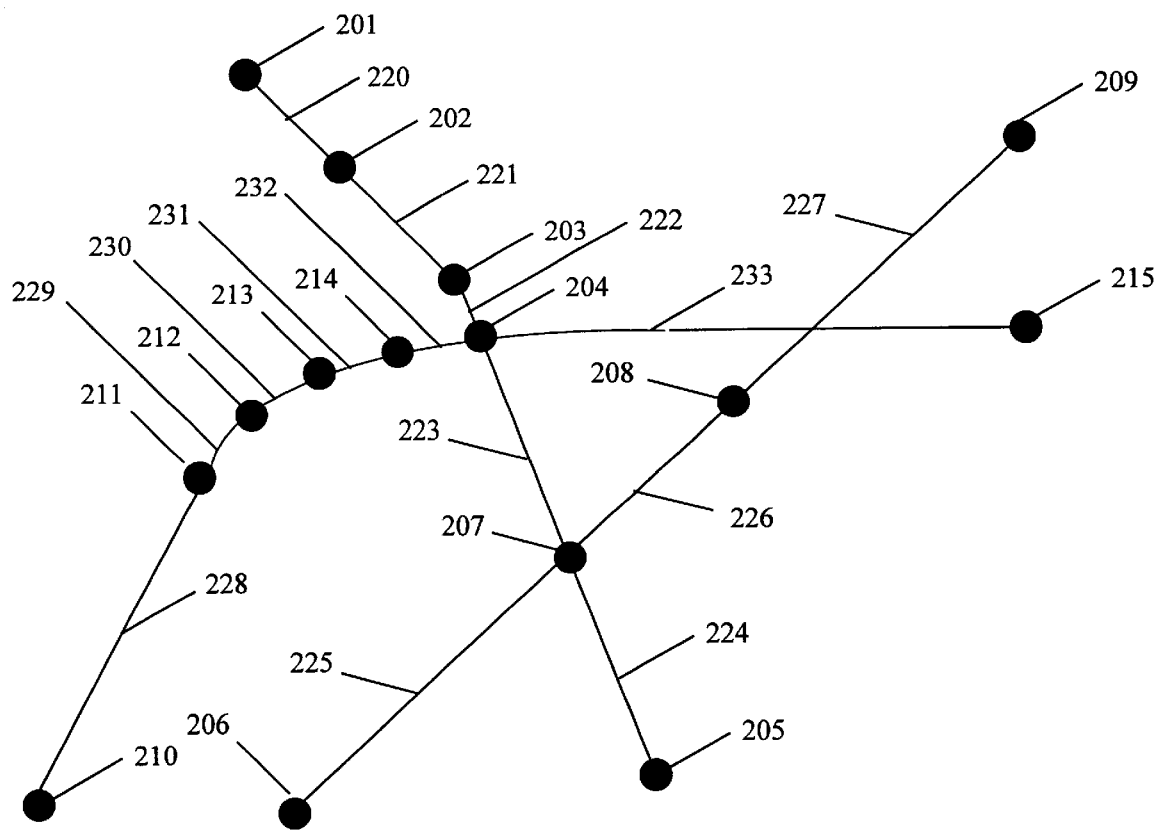
FIG. 2 illustrates various segments as they might appear on a digital map.

An illustration of a digitized map is shown in FIG. 2. In the preferred embodiment, in-vehicle system status and information display device 114 does not display a digitized map. The illustration of FIG. 2 is, nevertheless, beneficial for understanding the terminology used in conjunction with the map datafile 130. The map datafile 130 describes roadways as segments between nodes, e.g., nodes 201 through 215 and segments 220 through 233. These nodes 201 through 215 and segments 220 through 233 are assigned various properties. Some possible properties may be, for example: navigational position (i.e., latitude, longitude), direction, length, shape characteristic, identification number, and adjoining segments. The property "adjoining segments" allows roadway intersections to be differentiated from, for example, roadway overpasses. An example of a roadway overpass can be seen at the intersection of segments 227 and 233. Although these segments intersect on the representation of the digitized map, there is no physical intersection controlled by a traffic control device. Each node 201 through 215 in the map datafile 130 is associated with at least a latitude and longitude.

A digital map datafile 130 may be obtained from, e.g., ETAK of Menlo Park, Calif. which produces ETAKMap Premium (TM) or from Navigation Technologies Corporation of Rosemont, Ill. which produces NAVTECH (TM) database maps. A digital map datafile 130 includes information relating to the latitude and longitude of roadways used for vehicular traffic. In addition, digital maps may also include road segment attribute information such as street names, address ranges, turn restrictions, and points of interest information (e.g., restaurants, gas stations, police stations and hospitals). For example, in NAVTECH's database every road segment can have up to one hundred and fifty attributes attached to it.

The map datafile 130 may be augmented by a secondary look-up table 132 containing data on intersection navigational position (e.g., latitude and longitude), connecting roadways, and the types of traffic control devices encountered on a given roadway segment for each lawful vehicle heading. This data is available but not presently provided in presently-available commercial map datafiles due to a lack of applications for such data. It will therefore be appreciated that, at such time when data relating to traffic control devices is included in commercial map datafiles, the map datafile 130 and secondary look-up table 132 may be combined. The data comprising the map datafile 130 and the secondary look-up table 132 are collectively referred to as the GIS 134. In the preferred embodiment of FIG. 1, GIS data is integrated into one data file. Thus, in the preferred embodiment, there is no distinguishable map datafile 130 that is separate and apart from the secondary look-up table 132. The use of one integrated GIS 134 has the benefit of completeness in that all data is present in one file. If an update is necessary, then only one file need be replaced.

Updates to the GIS 134, whether comprised of one file or multiple files, may be accomplished via the data input device or port 110. If the GIS is stored on a removable medium, then the GIS may be updated by replacing the removable medium. An update may be necessary, for example, as traffic control devices are changed or added. The data input device or port 110 may be, for example, a keyboard, floppy disc, CD ROM, serial port, or cellular telephone interface. In a presently preferred embodiment, a wireless link would allow Internet downloads utilizing a CP2100 Mobile Network Server (TM), manufactured by CellPort of Boulder, Colo. It will be readily apparent to one skilled in the art that any methodology of loading data into a processing device 108 and storing such data on a data storage device 102 will be appropriate.

A driver-vehicle-interface 112 provides a warning indication of an equipped-vehicle's impending inability to stop before entering a controlled intersection. The warning may be, for example, an aural, a visual, or a haptic indication. In the preferred embodiment, the driver-vehicle-interface is comprised of a head-up display ("HUD") and an auditory system. The HUD and auditory systems are known commercially available components.

In the preferred embodiment, a GPS receiver 104(FIG. 1) generates data, which is utilized to locate the vehicle on a specific roadway segment. The preferred embodiment utilizes latitude and longitude data derived from the GPS receiver 104, updated at 10 Hz. The GPS receiver 104 provides the processing device 108 with at least an equipped-vehicle's latitude, longitude, and heading. Additionally, the GPS receiver 104 may provide the processing device 108 with an equipped-vehicle's velocity. However, the processing device may alternatively or additionally receive velocity information from other sensors, such as, for example, an equipped-vehicle's speedometer or odometer.

Vehicle state functions of position (in latitude and longitude), velocity, and heading may be provided by the GPS receiver 104. However, standard GPS with an accuracy of approximately one hundred meters, may not be suitable for most applications of the present invention. The use of DGPS increases the accuracy of the latitude and longitude determination to approximately three meters. This increase in accuracy allows for a reduction in the number of false alarms generated by the in-vehicle system 100. In order to use DGPS, a separate DGPS radio receiver 105 and associated antenna 107 may be connected to a compatible GPS receiver 104 or alternatively a GPS receiver with an integrated DGPS radio receiver may be utilized.

The DGPS radio receiver receives correction factors broadcast from a fixed ground position. This fixed ground position has had its latitude and longitude determined with great precision and is able to broadcast the error associated with GPS signals it receives from GPS satellites orbiting overhead. DGPS broadcast sites have been erected by both private and Governmental organizations. Hereinafter, references to DGPS mean a GPS receiver utilizing differential error correction. Navigational positioning data (ie., latitude, longitude, heading, and in some cases velocity) is supplied to the processing device 108 by the GPS receiver 104, regardless of whether DGPS is in use.

In the preferred embodiment, the GPS and DGPS antennas are mounted in a combined antenna mount, model MGW-1 available from CSI, Inc. The vehicle's navigational positioning data (i.e., latitude and longitude), generated by the GPS receiver, may be enhanced by the integration of a dead-reckoning navigation system which keeps track of vehicle location by its use of, for example, a gyroscope and vehicle velocity information. Gaps in GPS coverage sometimes occur because buildings and foliage may block GPS signals. In this situation, errors in GPS positioning increase. However, incorporation of a dead-reckoning navigation system can reduce these errors by filling-in navigational positioning data when GPS signal is lost. The preferred embodiment utilizes a DGPS in combination with a dead-reckoning system known as the "Continuous Positioning System," (TM) manufactured by KVH of Middletown, R.I. To receive DGPS signals, the preferred embodiment utilizes an ABX-3 Automatic Differential Beacon Receiver (TM) manufactured by CSI of Calgary, Canada.

The processing device 108 provides a capability to receive. data from the GPS receiver 104, access data in the GIS database 134 located on the data storage device 102, receive data from the traffic control device-to-vehicle communication system 120, and determine $a_p$, (i.e., acceleration required to prevent intersection entry).

A capability to stop at an intersection is dependent upon the traffic control device at that intersection. If the intersection is controlled by a stop sign, the requirement is to stop prior to entering the intersection. If the intersection is controlled by a phased signal, the requirement to stop depends upon signal phasing as a function of time.

A traffic control device-to-vehicle communication system 120 may be utilized which provides the approaching vehicle with information regarding the present traffic control device phase and the time until the traffic control device changes phase. Preferably, information regarding each traffic control device for each approaching roadway, along with intersection identification information, should be broadcast from each intersection wherein a phased traffic light is present. A transmitter at each intersection would transmit a digitally-encoded data message (utilizing, for example, spread-spectrum transmission in the 2.4 to 2.483 GHz band) in an omni-directional pattern at a periodic rate. The message would describe signal-phasing information for all approaches to that intersection. The approaching vehicle would provide capability to interpret the coded information and select appropriate data for its direction of travel.

Figure 3:
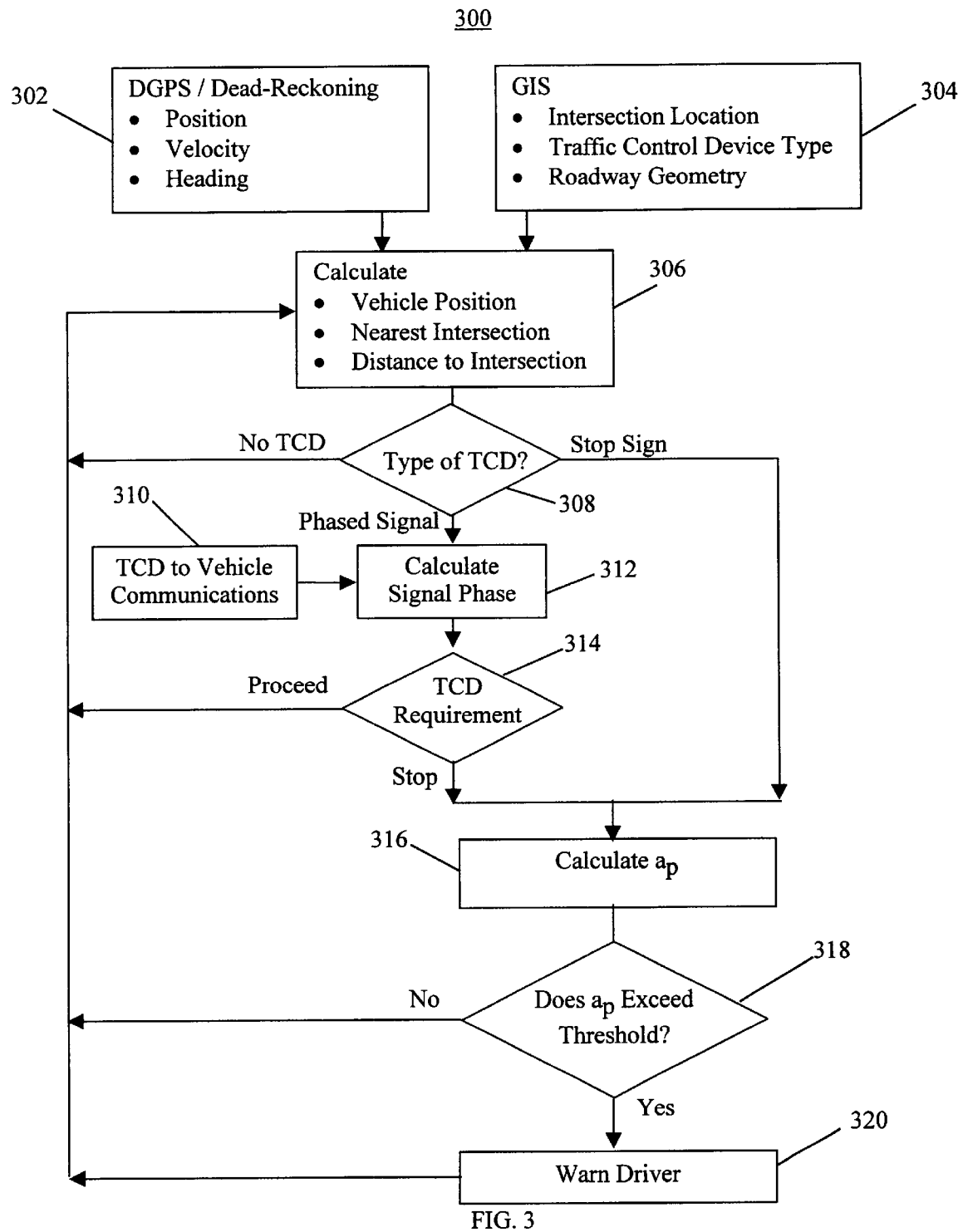
FIG. 3 is a schematic illustration of functional steps for determining whether to warn a driver of a potential violation of a traffic control device at a given intersection.

FIG. 3 is a flow chart 300, which is a schematic illustration of fumctional steps for determining whether to warn a driver of a potential violation of a traffic control device at a given intersection. At 302, the DGPS/dead-reckoning receiver presents latitude, longitude, heading, and velocity of the equipped-vehicle to the processing device (not shown). At 304, information from the GIS is available for query from the processing device. At 306, the processing device calculates, from the vehicle's latitude and longitude, the location and identity of the nearest intersection in the direction of the vehicle's heading, as well as distance to the intersection. At 308, data from the GIS allows the processing device to determine the type of traffic control device in the upcoming intersection (ie., a phased traffic light or a stop sign). If no traffic control device is present at the upcoming intersection, the flow chart path branches back to 306.

If the traffic control device is a phased traffic light, the equipped-vehicle obtains the phase and time to phase change from a communication channel established between the traffic control device and the vehicle 310. The processing device calculates what the phase will be when the equipped-vehicle begins to enter the intersection 312. In a decision step 314, the processing device determines whether the vehicle is able to comply with the traffic control device (i e., lawfully proceed through the intersection). If so, the flow chart path branches back to 306. If, however the processing device determines that the traffic control device will require the equipped-vehicle to stop prior to entering the intersection, then step 316 is reached and $a_p$ is calculated.

If, in step 308, the processing device determines that the traffic control device is a stop sign, then step 316 is reached and $a_p$ is calculated.

The $a_p$ metric is calculated using equation 1, below.

$$a_p = \frac{(T_d v + 0.36v + v^2)/d}{32.2} \quad (1)$$

where:
T$_d$=time from driver recognition of alarm to start of equipped-vehicle deceleration (seconds)(typically approximately two seconds)
v=vehicle velocity (ft./sec.)
d=distance to intersection (ft.)

The metric $a_p$ is compared against a threshold level at step 318. If $a_p$ exceeds the threshold level, then a warning is issued to the driver in step 320 and thereafter, the flow chart path branches back to 306. If, however, the threshold level is not exceeded at step 318, then the flow chart branches back to step 306.

The evaluation of $a_p$ (or another comparable metric) facilitates the determination of a potential intersection violation. This metric relates to the braking effort required to prevent vehicle entry into the intersection. This metric is a fimction of driver time delays, vehicle distance to intersection and vehicle velocity. The magnitude of this metric is compared to normative data on driver deceleration at intersections. This normative data establishes a threshold level beyond which $a_p$ should not cross. If the processing device 108 determines that the value of $a_p$ exceeds a predetermined acceptable threshold level of acceleration, then a warning is annunciated to the driver, giving the driver sufficient time to brake the vehicle and decelerate and reduce the possibility of entry of the vehicle into the oncoming intersection.

The threshold level, used to trigger a warning or preempt driver control, should be greater than 0.18 g and less than 0.7 g, and more preferably should fall within the range of 0.3 to 0.5 g. This range of values allows the driver to proceed beyond the point where he/she would normally begin to react, yet still allows time for the driver to apply the brakes and bring the vehicle to a complete stop before the traffic control device is violated and the intersection is entered improperly. In the most preferred embodiment, a threshold level of about 0.35 g is utilized. The selected threshold level is stored in the in-vehicle system 100 data storage device 102 and used by the processing device 108.

The vehicle's latitude and longitude is correlated with the location of a roadway in the GIS map. If system inaccuracy in the positioning determining device (e.g., GPS, DGPS, dead-reckoning, or any combination thereof) or GIS places the vehicle off the roadway, software corrects the location of the vehicle onto the nearest roadway. Use of DGPS makes this allocation of the vehicle to a specific roadway a more accurate process than when using GPS only. With the vehicle located on a specific segment (e.g., 222 in FIG. 2) vehicle-heading data is used to determine which node (e.g., 204 in FIG. 2) the vehicle is approaching.

With the roadway and node located, the vehicle heading and GIS database 134 can be used with an association algorithm in the processing device 108 to determine if the node is an intersection. If the node is an intersection, other data such as the adjoining segments, the geometry of the intersection (e.g., four-way, junction right/left, or "T"), and the type of traffic control device for each traversed direction is determined by query of the GIS database 134.

Figure 4:
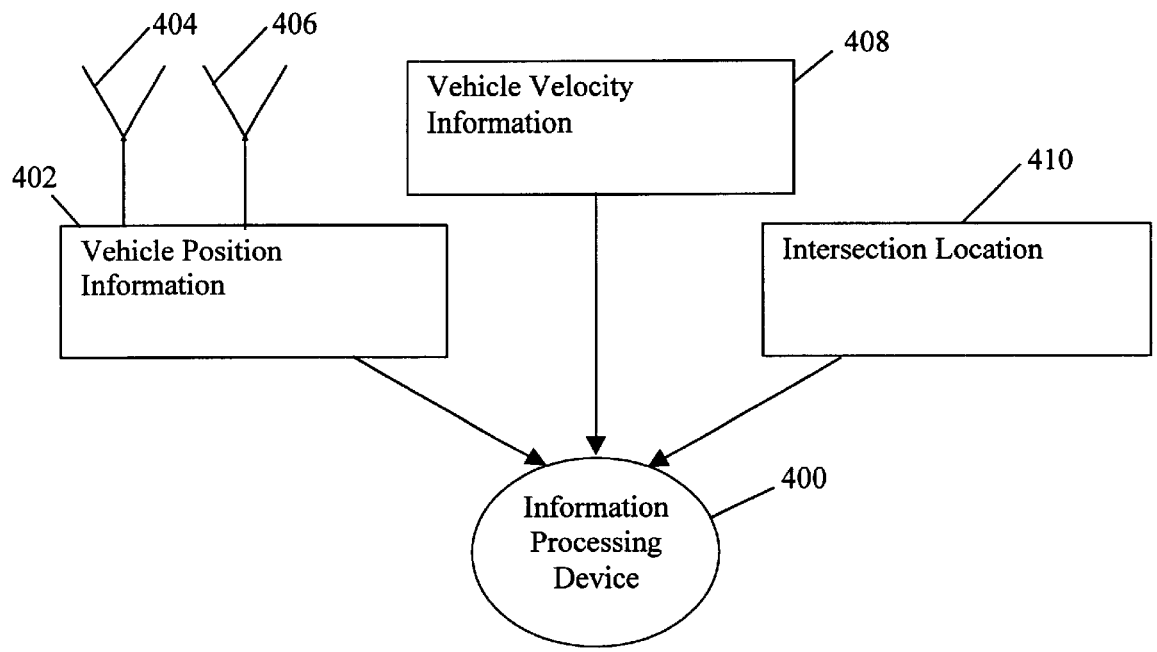
FIG. 4 is a schematic illustration of sources of information utilized to calculate $a_p$.

FIG. 4 is a schematic illustration of sources of information utilized to calculate $a_p$. GPS and DGPS data are applied to the in-vehicle system via appropriate antennas 404 and 406. The equipped-vehicle's latitude, longitude, and heading are obtained from the position determining device (e.g., GPS/DGPS/dead-reckoning receiver) 402. Vehicle velocity 408 is provided to the system processing device 400 from either the GPS receiver 402 or from the vehicle's speedometer or odometer. Intersection latitude and longitude is obtained by the system processing device 400 from the GIS 410. Utilizing latitude and longitude of the equipped-vehicle and the intersection, the system processing device 400 calculates the distance of the equipped-vehicle from the intersection and calculates $a_p$ based on that information and the vehicle's velocity.

Figure 5:
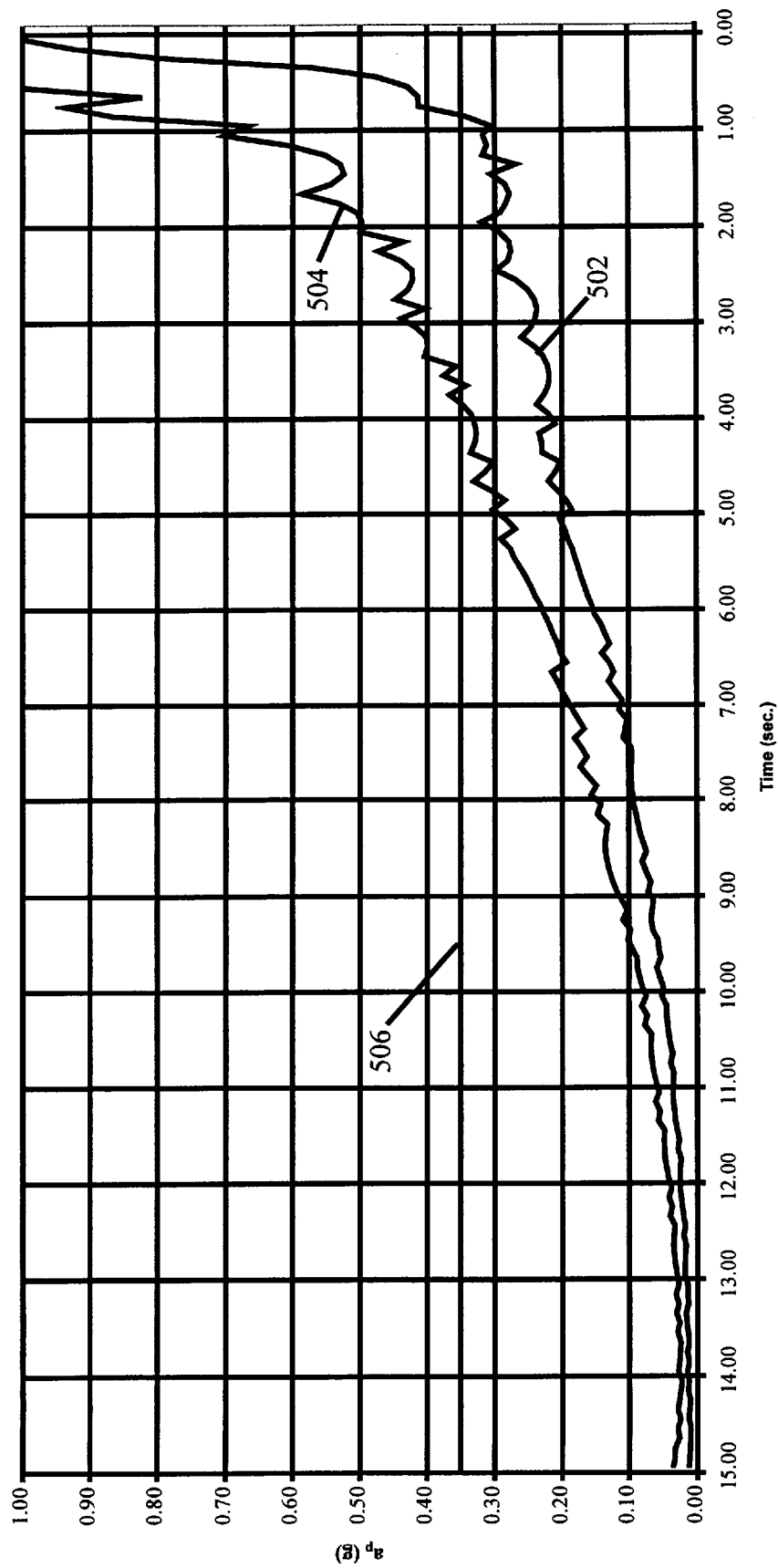
FIG. 5 is a typical graph of $a_p$ vs. time for two intersection approaches.

FIG. 5 shows an example of $a_p$ for a normal intersection approach 502 without violation of the traffic control device and for an intersection approach 504 that does violate the traffic control device. In the preferred embodiment, the processing device 108 initiates a warning via the driver-vehicle-interface 112 when $a_p$=0.35. In the approach 504 that does violate the traffic control device, $a_p$ reaches the threshold level 506 at approximately four seconds before intersection entry. In the approach that does not violate the traffic control device 502, $a_p$ reaches the threshold level 506 at approximately one second before intersection entry. As is shown in the plot of 502, as a driver normally approaches the intersection the value of $a_p$ will exceed the threshold level 506 when distances become very small (for example, generally less than ten feet). In order to prevent a warning from being issued in this last small distance before the intersection is reached (and when vehicle speed is very slow), the processing device 108 will not initiate a warning if the vehicle speed is less than approximately five miles per hour. At this speed, which may occur, for example, in the last ten feet or the last second before intersection entry, it is recognized that a driver can quickly stop the forward motion of the equipped-vehicle.

By way of example, let the predetermined threshold level 506 be set at 0.35 g's and let the time from driver recognition of alarm to start of equipped-vehicle deceleration be 2 seconds. Using equation 1, if an equipped-vehicle is traveling at 30 mph (44.2 feet per second) and is 300 feet from an intersection then the magnitude of $a_p$ is 0.21. No driver warning is issued, nor is driver control preempted, because the driver can still safely and comfortably bring the vehicle to a complete stop before the vehicle violates the traffic control device. If the same vehicle continuing at the same speed is 200 feet from the intersection then the magnitude of $a_p$ is 0.32. Although the magnitude of $a_p$ has increased (i.e., the driver will have to apply greater pressure to the brakes in order to stop the vehicle), still no driver warning is issued, nor is driver control preempted, because the driver can still safely and comfortably bring the vehicle to a complete stop before the vehicle violates the traffic control device. But, however, if the vehicle is still traveling at 30 mph when it is 175 feet from the intersection then the magnitude of $a_p$ is 0.36. This value is just over the predetermined threshold level 506 of acceleration required to safely bring the vehicle to a complete stop before the traffic control device is violated. Once $a_p$ exceeds the threshold level 506, a warning is issued to the driver.

In another mode of operation, the in-vehicle system 100 (FIG. 1) determines that the equipped-vehicle is stopped at a traffic light and monitors the location of the vehicle to determine if the vehicle is beginning to move into the intersection in violation of the traffic light. An indication of braking activity may come from an interface with the vehicle's braking system, the vehicle's velocity determining device, and/or the navigational positioning device. The GPS receiver 104, or other navigational positioning devices may provide the equipped-vehicle's latitude and longitude. The phase of a phased traffic device (iLe., a traffic light) is determined from the traffic-control-device-to-vehicle communications system 120. If a change in position indicates that the equipped-vehicle is about to enter the intersection while the traffic control device is indicating red, then a warning will be issued to the driver, thus avoiding a potential collision of the type identified in Scenario 3 of Table 1.

Figure 6:
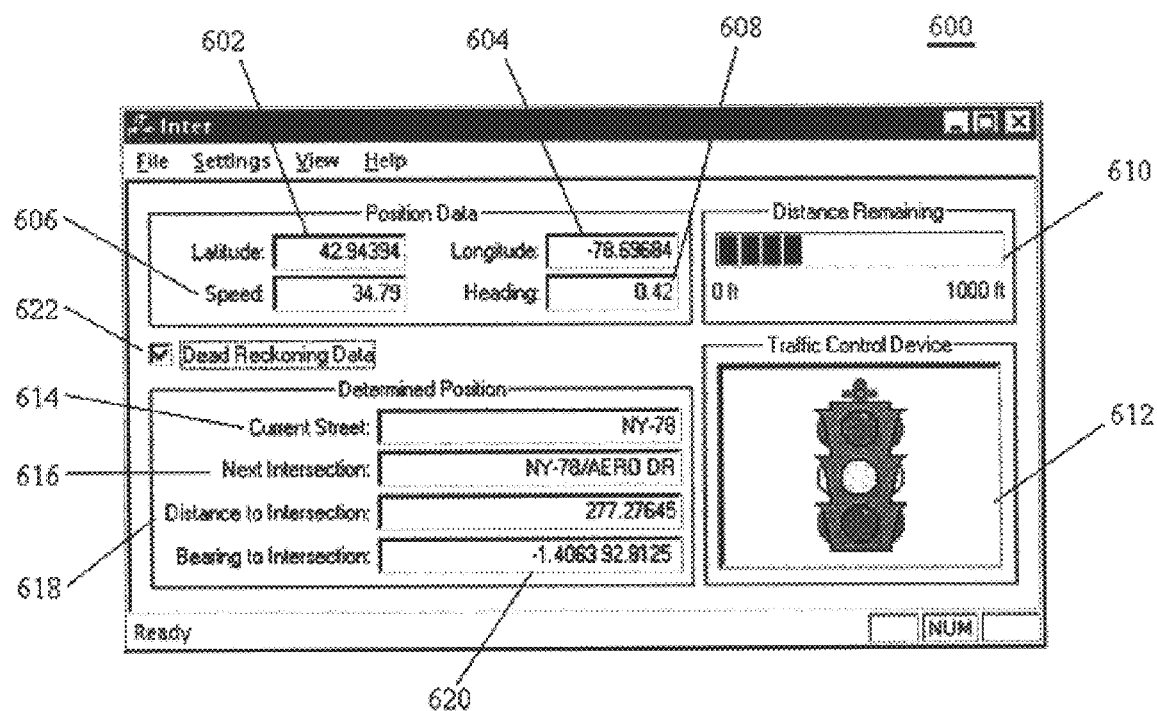
FIG. 6 illustrates one possible display of the information that is derived from the GIS.

The in-vehicle system status and information display device 114 (FIG. 1) may take any of a variety of forms. FIG. 6 illustrates one possible example of a in-vehicle system status and information display 600. In this preferred embodiment, the in-vehicle system status and information display device 600 displays the equipped-vehicle's: position in latitude 602, position in longitude 604, velocity 606, and heading 608. Also displayed are the distance remaining to the next intersection (both graphically 610 and textually 618) and a graphical depiction of the type of traffic control device located at the next intersection 612. Also displayed are the name of the street the equipped-vehicle is presently traveling on 614, the names of the streets at the next intersection 616, the bearing to the next intersection 620, and an indication of whether the dead-reckoning feature is enabled 622.

In the preferred embodiment, the warning may be provided to the driver in one of two modes: an advisory mode, or a warning mode. In the advisory mode, a warning regarding a traffic control device is presented to the driver approximately 300 feet prior to each intersection entry. This distance allows the driver time to react to the "instruction" presented by the traffic control device (e.g, stop or go) at the upcoming intersection without using extreme control actions, such as severe braking. The advisory mode may be useful to older drivers, or drivers who are unfamiliar with the area in which they are driving.

The warning mode of operation utilizes the $a_p$ metric to send traffic control device information to the driver. In this mode of operation, the in-vehicle system 100 would provide a warning to the driver when the in-vehicle system 100 determines that there is a potential for traffic control device violation. For those instances when the driver properly prepares to stop prior to intersection entry, the in-vehicle system 100 would not provide any traffic control device information.

The embodiments described herein are intended to be illustrative and not limiting. It will be appreciated that many variations are possible within the scope and spirit of the invention.

Having set forth the general nature and specific embodiments of the present invention, the true scope is particularly pointed out in the appended claims.

What is claimed is:

1. An apparatus for determining a potential violation of an intersection traffic control device comprising:
   a data storage device onboard a vehicle storing digital mapping data and intersection traffic control device data;
   a navigational positioning device generating an indication of position and heading of the vehicle based on global positioning data;
   a velocity determining device generating an indication of a velocity of the vehicle;
   a data processing device configured to determine a metric indicative of the vehicle's ability to stop prior to entry into an intersection controlled by a traffic control device; and
   a driver-vehicle-interface configured to generate a warning to a vehicle driver of the vehicle's impending inability to stop before the vehicle enters the intersection.

2. An apparatus as in claim 1, further comprising a traffic control device-to-vehicle communications device receiving traffic control device phase and time to phase change data.

3. An apparatus as in claim 1, further comprising a system status and information display device displaying system status and information to the vehicle's driver.

4. An apparatus as in claim 1, further comprising a brake-system interface to a vehicle braking system, said brake system interface connected to initiate vehicle braking.

5. An apparatus as in claim 1, wherein said data processing device initiates a braking device, such that the braking device preempts the vehicle driver's control of the vehicle and begins braking the vehicle.

6. An apparatus as in claim 1, wherein said driver-vehicle-interface indications is chosen from the group of aural, visual, or haptic indicators.

7. An apparatus as in claim 6, wherein said driver-vehicle-interface comprises more than one indicator selected from said group.

8. An apparatus as in claim 6, wherein said visual indicator comprises a head-up-display.

9. An apparatus as in claim 1, wherein said navigational positioning device comprises a global positioning system receiver.

10. An apparatus as in claim 9, wherein said global positioning system receiver utilizes differential error correction (i.e., differential GPS).

11. An apparatus as in claim 1, wherein said navigational positioning device comprises a dead-reckoning system.

12. An apparatus as in claim 1, wherein, if the indication of vehicle position is off the roadway, the indication of position is modified to be on the nearest roadway.

13. An apparatus as in claim 1, wherein said velocity determining device is said navigational positioning device.

14. An apparatus as in claim 1, wherein said velocity determining device is selected from the group of the vehicle's speedometer and odometer.

15. A data storage device as in claim 1, wherein said data storage device comprises more than one device selected from the group of: a hard disc, a CD-ROM, a digital tape, a solid state memory, a readable/writeable CD.

16. An apparatus for determining a potential violation of an intersection traffic control device comprising:
a data storage device storing digital mapping data and intersection traffic control device data;
a navigational positioning device generating an indication of position and heading of a vehicle;
a velocity determining device generating an indication of a velocity of the vehicle;
a data processing device configured to determine a metric indicative of the vehicle's ability to stop prior to entry into an intersection controlled by a traffic control device; and
a driver-vehicle-interface configured to generate a warning to a vehicle driver of the vehicle's impending inability to stop before the vehicle enters the intersection;
wherein said metric is calculated as a value $a_p$ proportional to vehicle velocity and the square of vehicle velocity, and inversely proportional to a distance between the vehicle and an intersection.

17. An apparatus for determining a potential violation of an intersection traffic control device comprising:
a data storage device storing digital mapping data and intersection traffic control device data;
a navigational positioning device generating an indication of position and heading of a vehicle;
a velocity determining device generating an indication of a velocity of the vehicle;
a data processing device configured to determine a metric indicative of the vehicle's ability to stop prior to entry into an intersection controlled by a traffic control device; and
a driver-vehicle-interface configured to generate a warning to a vehicle driver of the vehicle's impending inability to stop before the vehicle enters the intersection;
wherein said metric is defined by the equation $$a_p = \frac{(T_d v + 0.36v + v^2)/d}{32.2}$$

where:
$T_d$=time from driver recognition of alarm to start of equipped-vehicle deceleration (seconds)
v=vehicle velocity (ft./sec.)
d=distance to intersection (ft.).

18. A method of warning a driver of a vehicle of a potential violation of an intersection traffic control device comprising:
generating measures of vehicle heading, and velocity;
generating a measure of vehicle position based on global positioning data;
identifying an oncoming intersection from a digitally stored map onboard the vehicle;
determining a type of traffic control device associated with the intersection;
determining if the traffic control device requires the vehicle to stop before entering the intersection and, if the vehicle is required to stop, then:
determining an acceleration required to bring the vehicle to a stop;
comparing said acceleration to a threshold level of acceleration; and
issuing a warning to the vehicle's driver if said acceleration exceeds said threshold level.

19. A method of warning a driver of a vehicle of a potential violation of an intersection traffic control device comprising:
obtaining heading and velocity of the vehicle;
obtaining a position of the vehicle from global positioning data;
determining a nearest intersection from an onboard digitally stored map in the direction of the vehicle's heading;
calculating a distance to the intersection;
determining if a traffic control device at the intersection requires the vehicle to stop prior to entry of the intersection by the vehicle;
calculating a metric indicative of an acceleration required to stop the vehicle prior to entry of the intersection by the vehicle;
alerting the driver if the vehicle is required to stop and said metric exceeds a threshold level.

20. A method of warning a driver of a vehicle of a potential violation of an intersection traffic control device comprising:
obtaining position, heading and velocity of the vehicle;
determining a nearest intersection in the direction of the vehicle's heading;
calculating a distance to the intersection;
determining if a traffic control device at the intersection requires the vehicle to stop prior to entry of the intersection by the vehicle;
calculating a metric indicative of an acceleration required to stop the vehicle prior to entry of the intersection by the vehicle;
alerting the driver if the vehicle is required to stop and said metric exceeds a threshold level;
wherein said metric is calculated as a value $a_p$ proportional to vehicle velocity and the square of vehicle velocity, and inversely proportional to a distance between the vehicle and an intersection.

21. The method of claims 19 or 20 wherein the threshold level is selected from a range of values greater than 0.18 g and less than 0.7 g.

22. The method of claims 19 or 20 wherein the threshold level is selected from a range of values from about 0.3 g to about 0.5 g.

23. The method of claims 19 or 20, wherein the threshold level is about 0.35 g's.

24. A method of warning a driver of a vehicle of a potential violation of an intersection traffic control device comprising:
obtaining position, heading and velocity of the vehicle;
determining a nearest intersection in the direction of the vehicle's heading;
calculating a distance to the intersection;
determining if a traffic control device at the intersection requires the vehicle to stop prior to entry of the intersection by the vehicle;

calculating a metric indicative of an acceleration required to stop the vehicle prior to entry of the intersection by the vehicle;

alerting the driver if the vehicle is required to stop and said metric exceeds a threshold level;

wherein said metric is defined by the equation $$a_p = \frac{(T_d v + 0.36v + v^2)/d}{32.2}$$

where:
$T_d$=time from driver recognition of alarm to start of equipped-vehicle deceleration (seconds)
v=vehicle velocity (ft./sec.)
d=distance to intersection (ft.).

25. A system for determining if a traffic control device requires a vehicle to stop prior to entry of the intersection by the vehicle comprising:
   a vehicle;
   a traffic control device;
   a communications link between said vehicle and said traffic control device; and
   an apparatus onboard said vehicle comprising:
      a data storage device storing digital mapping data and traffic control device data;
      a navigational positioning device generating an indication of position and heading of said vehicle based on global positioning data;
      a velocity determining device generating an indication of a velocity of said vehicle;
      a data processing device configured to determine a metric indicative of said vehicle's ability to stop prior to entry into an intersection controlled by said traffic control device; and
      a driver-vehicle-interface configured to generate a warning to a vehicle driver of the vehicle's impending inability to stop before said vehicle enters the intersection.

26. The system of claim 25, wherein the communications link is a radio frequency link.

27. The system of claim 25, wherein the communications link is a spread spectrum modulated link.

28. An apparatus for advising a driver of an oncoming traffic control device comprising:
   a data storage device onboard a vehicle storing digital mapping data and intersection traffic control device data;
   a navigational positioning device generating an indication of position and heading of said vehicle based on global positioning data;
   a data processing device configured to determine a type of traffic control device associated with an oncoming intersection utilizing data from said data storage device and said navigational positioning device; and
   a driver-vehicle-interface configured to generate a warning to a vehicle driver of the vehicle's approach to an oncoming traffic control device.

29. An apparatus as in claim 28, further comprising a traffic control device-to-vehicle communications device receiving traffic control device phase and time to phase change data.

30. An apparatus as in claim 28, further comprising a system status and information display device displaying system status and information to the vehicle's driver.

31. An apparatus as in claim 28, further comprising a brake-system interface to a vehicle braking system, said brake system interface connected to initiate vehicle braking.

32. An apparatus as in claim 28, wherein said driver-vehicle-interface indications is chosen from the group of aural, visual, or haptic indicators.

33. An apparatus as in claim 32, wherein said driver-vehicle-interface comprises more than one indicator selected from said group.

34. An apparatus as in claim 32, wherein said visual indicator comprises a head-up-display.

35. An apparatus as in claim 28, wherein said navigational positioning device comprises a global positioning system receiver.

36. An apparatus as in claim 35, wherein said global positioning system receiver utilizes differential error correction (i.e., differential GPS).

37. An apparatus as in claim 28, wherein said navigational positioning device comprises a dead-reckoning system.

38. An apparatus as in claim 28, wherein, if the indication of vehicle position is off the roadway, the indication of position is modified to be on the nearest roadway.

39. A data storage device as in claim 28, wherein said data storage device comprises more than one device selected from the group of: a hard disc, a CD-ROM, a digital tape, a solid state memory, a readable/writeable CD.

40. A method of determining if a vehicle is proceeding through a red traffic light and warning a driver of same comprising the steps of:
   obtaining a navigational position of the vehicle based on global positing data;
   obtaining a navigational position of an intersection from a digital map on board the vehicle;
   obtaining a type of a traffic control device located at the intersection;
   obtaining traffic control device phase data;
   obtaining traffic control device time to phase change data;
   obtaining an indication of braking activity;
   determining if the vehicle is entering the intersection in contravention of the red traffic light from vehicle position and traffic control device phase and, if so, then;
   issuing a warning to the driver.

41. A method of warning a driver of a vehicle of a potential violation of an intersection traffic control device comprising:
   obtaining position, heading and velocity of the vehicle;
   determining a nearest intersection in the direction of the vehicle's heading;
   calculating a distance to the intersection;
   determining if a traffic control device at the intersection requires the vehicle to stop prior to entry of the intersection by the vehicle;
   calculating a metric indicative of an acceleration required to stop the vehicle prior to entry of the intersection by the vehicle;
   alerting the driver if the vehicle is required to stop and said metric exceeds a threshold level;
   wherein said metric is calculated as a value $a_p$ proportional to vehicle velocity and inversely proportional to a distance between the vehicle and an intersection.

42. An apparatus for determining a potential violation of an intersection traffic control device comprising:
   a data storage device storing digital mapping data and intersection traffic control device data;
   a navigational positioning device generating an indication of position and heading of a vehicle;
   a velocity determining device generating an indication of a velocity of the vehicle;

a data processing device configured to determine a metric indicative of the vehicle's ability to stop prior to entry into an intersection controlled by a traffic control device; and a driver-vehicle-interface configured to generate a warning to a vehicle driver of the vehicle's impending inability to stop before the vehicle enters the intersection;

wherein said metric is calculated as a value $a_p$ proportional to vehicle velocity and inversely proportional to a distance between the vehicle and an intersection.

43. An apparatus for determining a potential violation of an intersection traffic control device comprising:

a data storage device onboard a vehicle storing digital mapping data and intersection traffic control device data;

a navigational positioning device repeatedly generating an indication of position and heading of the vehicle;

a velocity determining device generating an indication of a velocity of the vehicle;

a data processing device configured to determine a metric indicative of the vehicle's ability to stop prior to entry into an intersection controlled by a traffic control device based on updating information from the navigation positioning device and the velocity determining device; and a driver-vehicle-interface configured to generate a warning to a vehicle driver of the vehicle's impending inability to stop before the vehicle enters the intersection.

44. A method of warning a driver of a vehicle of a potential violation of an intersection traffic control device comprising:

repeatedly obtaining position, heading and velocity of the vehicle;

determining a nearest intersection from a digital map onboard the vehicle in the direction of the vehicle's heading;

calculating a distance to the intersection;

determining if a traffic control device at the intersection requires the vehicle to stop prior to entry of the intersection by the vehicle;

calculating a metric indicative of an acceleration required to stop the vehicle prior to entry of the intersection by the vehicle based on updating information from said repeatedly obtaining; and alerting the driver if the vehicle is required to stop and said metric exceeds a threshold level.

* * * * *